United States Patent Office 3,383,367
Patented May 14, 1968

3,383,367
ACTIVATORS FOR THE POLYMERIZATION
OF PYRROLIDONE
William B. Black and Beachley A. Morehead, Decatur, Ala., assignors, by mesne assignments, to Monsanto Company, a corporation of Delaware
No Drawing. Filed Sept. 25, 1958, Ser. No. 763,268
20 Claims. (Cl. 260—78)

This invention relates to a new process for polymerizing pyrrolidone. More particularly, the invention is concerned with a new polymerization procedure for the manufacture of pyrrolidone polymers, wherein new catalyst-activator systems are employed.

Pyrrolidone is normally polymerized in the presence of a polymerization catalyst, such as the alkali metals and various organic metallic compounds, as well as sodium amide, calcium oxides and hydroxides, and the like. It has been found that the activity of these catalysts during the polymerization reaction can be enhanced by the addition thereto of various compounds which are classed as polymerization activators. For example, among the compounds heretofore proposed as polymerization activators, there may be named the acyl compounds, such as acetyl pyrrolidone, acetyl morpholone, benzoyl chloride and the like; lactones, such as gamma butyrolactone, and the like; alkyl esters of mono- and dicarboxylic acids, such as ethyl acetate, ethyl oxalate, and the like; and the esters of polyhydric alcohols, such as ethylene glycol diacetate, and the like. However, the presently known catalyst-activator systems for the polymerization of pyrrolidone leave much to be desired.

Many of the compounds heretofore proposed as polymerization activators for pyrrolidone polymerization are difficult to handle, which obviously makes them undesirable from a commercial standpoint. Furthermore, many of the prior art compounds proposed as activators tend to affect the polymers as they are formed, resulting in undesirable color and detrimental changes in physical properties of the polymers. In addition, many of the prior art compounds introduce end groups into the polymer chains which decrease the dye receptivity thereof. Moreover, many of the prior art activators result in the production of polymers having relatively low specific viscosities. Shaped articles, such as fibers for example, formed from such polymers are weak and cannot be drawn to any given degree. Accordingly, there has been a need in the art for a catalyst-activator system which overcomes the above disadvantages and which is easily and readily adaptable to a commercial operation.

It is the principal object of the present invention to provide new catalyst-activator systems for the polymerization of pyrrolidone. It is another object of the invention to provide new catalyst-activator systems for the polymerization of pyrrolidone which result in the formation of polymers having desirable improved physical properties, such as good solubility, excellent color and high molecular weight. It is another object of the invention to provide new catalyst-activator systems for the polymerization of pyrrolidone which result in the formation of polymers having greatly improved dyeability. It is a further object of the invention to provide a new process for preparing pyrrolidone polymers. Other objects and advantages of the invention will be apparent from the description thereof hereinafter.

In general, the objects of the invention are accomplished by polymerizing monomeric pyrrolidone under polymerization conditions in the presence of a polymerization catalyst and activating the polymerization with a trihalide of aluminum, bismuth and antimony, a tetrahalide of tin, titanium, zirconium and lead, or the pentahalide of antimony.

The tri-, tetra- and pentahalides of the elements mentioned above suitable for use in the practice of this invention include aluminum trichloride, aluminum tribromide, aluminum triiodide, stannic tetrachloride, stannic tetrabromide, stannic tetraiodide, titanium tetrachloride, titanium tetrabromide, lead tetrachloride, zirconium tetrachloride, bismuth trichloride, bismuth tribromide, antimony trichloride, antimony tribromide, antimony triiodide, antimony pentachloride, antimony pentaiodide, antimony pentafluoride and the like.

The polymerization activators can be employed with any of the known catalysts normally used in the polymerization of monomeric pyrrolidone. Among the catalysts for polymerizing pyrrolidone which are useful in the practice of the present invention are the alkali metals, that is, sodium, potassium, and lithium; the hydrides, hydroxides, oxides, and salts of the alkali metals, that is, such salts as sodium, potassium, and lithium pyrrolidone; organic metallic compounds, preferably those which are strongly basic, for example, the lithium, potassium, and sodium alkyls and aryls of the alkali metals, such as sodium phenyl and the like; sodium amide, and other cataylsts.

Preparation of polypyrrolidone with the activators of this invention may be carried out with varying amounts of components. In general, the chemical equivalent amount of catalyst must exceed by at least a slight excess the number of chemical equivalents of activator. The catalyst may be employed in a range of 0.002 to 0.25 chemical equivalents of catalyst based upon one mole of monomeric pyrrolidone. It is preferred, however, that the catalyst be employed in a range of 0.005 to 0.25 chemical equivalents of catalyst based upon one mole of monomeric pyrrolidone. The activator is employed in a range of 0.0001 to 0.075 chemical equivalents of activator based upon one mole of monomeric pyrrolidone. Preferably, however, the activator is employed in a range of 0.001 to 0.075 chemical equivalents of activator based upon one mole of monomeric pyrrolidone. Thus, for activators containing more than one potentially reactive substituent on the salts named hereinabove, the maximum number of moles of activator that can be employed for a given number of moles of catalyst must be considerably less than the number of moles of catalyst. For example, where one mole of aluminum trichloride, three chemical equivalents, is employed in carrying out the polymerization, a slight excess of three moles, three chemical equivalents, of catalyst is required.

The polymerization reaction of this invention is carried out at temperatures within a range of −70° C. to 100° C. In the preferred practice of the invention, however, the polymerization reaction is carried out at a temperature in the range of 20° C. to 70° C. The reaction time will vary with the temperature and the amount of monomer employed. Where higher temperatures are used in the polymerization reaction, the total time required to complete polymerization is shorter. The polymerization period is also greatly affected by the particular catalyst-activator system employed. Generally, in carrying out a polymerization reaction according to the present invention, the monomer, catalyst, and activator are placed in a polymerization vessel and subjected to polymerization temperatures as hereinabove defined. However, the steps necessary to obtain complete polymerization will vary, depending upon the type of catalyst which is employed. For example, many of the catalysts, such as potassium hydroxide, cause the formation of water during the polymerization reaction.

The presence of such water has a deleterious effect upon the polymerization reaction, namely, it hinders further polymerization and even brings the same to a halt in many instances. Accordingly, in order to achieve the desired results, it is necessary to remove such water of reaction from the reaction medium. This can easily be accomplished by a simple vacuum distillation. Therefore, when employing a catalyst, such as sodium hydroxide, the monomeric pyrrolidone is placed in the polymerization vessel and the catalyst added thereto. The reactants are then subjected to vacuum distillation and mechanical stirring in order to remove the water formed. Although mechanical stirring is not absolutely necessary, it greatly aids in removal of the water. When all of the water in the reaction vessel is completely removed, the activator is then added to the reaction mixture and the reaction continued. When an alkali hydride is employed as the catalyst, all of the reactants may be added to the polymerization vessel simultaneously, and thereafter the reaction carried through to completion. However, it is preferred to add the alkali hydride to the monomer in the reaction vessel and then remove the hydrogen thus generated prior to the addition of the activator to the reaction mass. This procedure eliminates all danger of any possible explosive results due to the presence of hydrogen in the reaction vessel. An advantage in the use of an alkali hydride over the water-forming catalyst, such as potassium hydroxide, is the elimination of the distillation step necessary for the removal of the water of reaction, since with hydrides a pyrrolidone salt and gaseous hydrogen are formed.

The instant method for polymerizing pyrrolidone may be carried out by either solution, emulsion, suspension or bulk polymerization techniques. The solution and emulsion polymerizations may be either batch or continuous methods. When solution polymerization is employed, the monomeric pyrrolidone is dissolved in a solvent such as 1,4-dioxane. The desired catalyst and activator are added to the solution and the polymerization is carried out under the proper conditions. Well-known solution polymerization apparatus is suitable for carrying out the methods employed in the practice of this invention. When applying emulsion or suspension polymerization procedures to the preparation of polypyrrolidone with the activators of the invention, the monomer containing the catalyst is dispersed in a known solvent therefor, such as petroleum ether, containing an emulsifying agent. Subsequently, the desired activator is added to the dispersion and the reaction mixture is subjected to polymerization conditions. A suitable coagulant is then added to the polymerized mixture in order to precipitate the polymer. A suitable emulsifying agent which may be employed is sodium lauryl sulfate, and a suitable coagulant is phosphoric acid.

While it is not positively known exactly what takes place when pyrrolidone is polymerized in accordance with the present invention, it is believed that the polymerization is accomplished by first forming ionic pyrrolidone salts. For example, when one employs potassium hydroxide as a catalyst, a reversible reaction takes place between the monomeric pyrrolidone molecules and the hydroxide ion, with the subsequent formation of water. Since this reaction is reversible, it is necessary that the water be removed in order to carry out polymerization. Formation of the pyrrolidone anion results in an electron distribution which is nucleophilic. In order for chain propagation to take place, the nucleophilic ion attaches to a pyrrolidone ring which has been activated by an activator molecule, thereby causing a weak bond in the ring between the nitrogen and the carbonyl group, and causing the ring to open, forming a newly activated position and an anion on the polymer chain. A proton (hydrogen ion) from a monomeric pyrrolidone transfers to the chain anion resulting in a metal-nitrogen linkage and the regeneration of a nucleophilic pyrrolidone anion to further catalyze the reaction. The catalyst is continuously consumed and generated throughout the entire reaction by the transfer of a proton (hydrogen ion) giving rise to the formation of the pyrrolidone anion. It is believed that the function of an activator is to activate the pyrrolidone monomer by displacing the hydrogen on the nitrogen atom of the pyrrolidone ring, thereby causing an electrophilic state within the monomeric pyrrolidone molecule, such that the bond between the nitrogen atom and the carbonyl group of the ring is broken when such molecule is attacked by a pyrrolidone anion, thereby forming a straight chain. Such chain is attached to a pyrrolidone ring by bonding to the nitrogen atom therein. The ring structure is in turn opened by the attack of a nucleophilic pyrrolidone ion formed by the transfer of a proton from a monomeric pyrrolidone molecule to a chain nitrogen. Irrespective of whether or not the above theory is correct, the use of the activators defined herein, to activate the polymerization of pyrrolidone, has produced unexpectedly good results. For example, as may be seen from the data in the following examples, there is a distinctive difference in the strength of the metal-nitrogen bonds and the benzamide bonds. On washing, a large portion of the former, that is the metal-nitrogen bonds, are hydrolyzed, whereas the latter are not. This hydrolysis of the metal-nitrogen bonds results in the formation of amine end groups on the polymer. Consequently, as one would expect, there is a great increase in dyeability with acid dyes of polypyrrolidone prepared with the activators of this invention in comparison to polypyrrolidone activated by the known carbonyl activators, such as benzoyl chloride, the latter leading to stable amide linkages. Emission spectrographic studies of the washed versus the unwashed polymers showed that the metal atoms were largely removed by the simple washing procedure. On the other hand, ultraviolet studies of the benzamide end groups of unwashed versus washed benzoyl chloride activated polypyrrolidone showed no evidence of any loss by hydrolysis of these end groups on washing.

Polypyrrolidone prepared with the activators of this invention has a melting point of about 260° C. and is soluble in formic acid, mixtures of formic acid and water, and all of the known solvents for polypyrrolidone. It is particularly adapted for use in the manufacture of shaped articles, such as filaments, fibers, films, rods, bristles and the like. Lower molecular weight polymers prepared in the same manner may be employed in the manufacture of coatings or lacquers.

Where the polypyrrolidone is to be employed in the formation of filaments, fibers, and the like, there are various methods known for filament and fiber formation. These methods include the melt spinning, dry spinning and wet spinning methods. Where the wet spinning method is employed, the polymer is dissolved in a suitable solvent and subsequently spun from the solution into a coagulating bath. In the dry spinning method, the polymer is dissolved in a volatile solvent and extruded into a heated atmosphere in order to remove the solvent. The melt spinning method involves melting the polymer under temperature and pressure and extruding the melt through a spinneret into the atmosphere.

Shaped articles which have a modified appearance or modified properties may be prepared from the polypyrrolidone whose polymerization has been activated by the activators of the instant invention. Various reagents to accomplish the desired effect include plasticizers, pigments, dyes, antistatic agents, fire-retarding agents and the like.

The following examples are intended to illustrate the invention more fully but are not intended to limit the scope thereof, for it is possible to effect many modifications therein. In the examples, all parts and percents are by weight unless otherwise indicated.

EXAMPLE I

To a 25 gram (0.294 mole) sample of essentially anhydrous pyrrolidone, there was added under a nitrogen atmosphere 0.75 gram (0.0315 mole) of sodium hydride catalyst. When the evolution of hydrogen gas was completed, 0.78 gram (0.00298 mole) of stannic chloride was added to the reaction mixture. This mixture was stoppered to protect it against the atmosphere and was permitted to stand for 25 hours at about 25° C. The polymer was recovered by breaking up the cake, grinding it in a Wiley mill, and washing the powder first with water, then with acetone in a Waring Blendor. The polymer was subsequently air-dried to constant weight. There was a yield of 12.0 grams or 49 percent of polymer recovered. The polymer had a specific viscosity, determined on 0.5 percent solutions of the polymer in 90 percent formic acid, of 4.372. A control sample prepared under the same conditions with monomer from the same batch but in the presence of 0.41 gram (0.00292 mole) of benzoyl chloride, an acyl activator, resulted in 6.9 grams or a 66 percent yield of polymer recovered, based on 10.4 grams of the polymer cake that was worked up. The benzoyl chloride activated polymer had a specific viscosity of only 1.375, determined in the same manner as the stannic chloride activated polymer. The comparative results are set forth in the table below.

| Activator | Grams Used | Ml. | Weight of Polymer Recovered | Percent Yield | $\eta_{sp}$. at 0.5% conc. in HCOOH |
|---|---|---|---|---|---|
| Benzoyl chloride | 0.41 | 0.34 | *6.9 | 66 | 1.375 |
| Stannic chloride | 0.78 | 0.35 | 12.0 | 49 | 4.372 |

*Based on 10.4 grams of the polymer cake worked up.

EXAMPLE II

To a 25 gram (0.294 mole) sample of essentially anhydrous pyrrolidone, there was added under a nitrogen atmosphere, 0.75 gram (0.0315 mole) of sodium hydride catalyst. When the evolution of hydrogen gas was completed, 0.39 gram (0.00293 mole) of anhydrous aluminum chloride was added to the reaction mixture. This mixture was stoppered to protect it against the atmosphere and permitted to stand for 25 hours at about 25° C. The polymer was recovered by breaking up the cake, grinding it in a Wiley mill, and washing the powder first with water, then with acetone in a Waring Blendor. There was recovered 19.3 grams or a 77 percent yield. The polymer had a specific viscosity, determined on 0.5 percent solutions of the polymer in 90 percent formic acid, of 3.914. A control sample prepared under the same conditions with monomer from the same batch but in the presence of 0.41 gram (0.00292 mole) of benzoyl chloride, an acyl activator, resulted in a yield of 6.9 grams or 66 percent of recovered polymer, based on 10.4 grams of the polymer cake that was worked up. The benzoyl chloride activated polymer had a specific viscosity of only 1.375, determined in the same manner as that of the aluminum chloride activated polymer. The comparative results are set forth in the table below.

| Activator | Grams Used | Ml. | Weight of Polymer Recovered | Percent Yield | $\eta_{sp}$. at 0.5% conc. in HCOOH |
|---|---|---|---|---|---|
| Benzoyl chloride | 0.41 | 0.34 | *6.9 | 66 | 1.375 |
| Aluminum chloride (anhydrous) | 0.39 | | 19.3 | 77 | 3.914 |

*Based on 10.4 grams of the polymer cake worked up.

EXAMPLE III

To a 25 gram (0.294 mole) sample of essentially anhydrous pyrrolidone, there was added under a nitrogen atmosphere 0.75 gram (0.0315 mole) of sodium hydride catalyst. When the evolution of hydrogen gas was completed, 0.88 gram (0.00294 mole) of antimony pentachloride was added to the reaction mixture. This mixture was stoppered to protect it against the atmosphere and was permitted to stand for 25 hours at about 25° C. The polymer was recovered by breaking up the cake, grinding it in a Wiley mill, and washing the powder first with water, then with acetone, in a Waring Blendor. The polymer was subsequently air-dried to constant weight. There was recovered a yield of 17.5 grams or 70 percent. The polymer had a specific viscosity, determined on 0.5 percent solutions of the polymer in 90 percent formic acid, of 3.024. A control sample prepared using monomer from the same batch under the same conditions, but with 0.41 gram (0.00292 mole) of benzoyl chloride, an acyl activator, resulted in 6.9 grams or a 66 percent yield of recovered polymer, based on 10.4 grams of the polymer cake worked up. The benzoyl chloride activated polymer had a specific viscosity of only 1.375, determined in the same manner as that of the antimony pentachloride activated polymer. The comparative results are set forth in the following table.

| Activator | Grams Used | Ml. | Weight of Polymer Recovered | Percent Yield | $\eta_{sp}$. at 0.5% conc. in HCOOH |
|---|---|---|---|---|---|
| Benzoyl chloride | 0.41 | 0.34 | *6.9 | 66 | 1.375 |
| Antimony pentachloride | 0.88 | 0.37 | 17.5 | 70 | 3.024 |

*Based on 10.4 grams of the polymer cake worked up.

EXAMPLE IV

To a 25 gram (0.294 mole) sample of essentially anhydrous pyrrolidone, there was added under a nitrogen atmosphere 0.75 gram (0.0315 mole) of sodium hydride catalyst. When the evolution of hydrogen gas was completed, 0.56 gram (0.00295 mole) of titanium tetrachloride was added to the reaction mixture. This mixture was stoppered to protect it against the atmosphere and permitted to stand for 25 hours at about 25° C. The polymer was recovered by breaking up the cake, grinding it in a Wiley mill, and washing the powder first with water, then with acetone, in a Waring Blendor. The polymer was subsequently air-dried to constant weight. There was recovered 19.2 grams or a 77 percent yield of polymer. The polymer had a specific viscosity, determined on 0.5 percent solutions of the polymer in 90 percent formic acid, of 0.761.

EXAMPLE V

To 62.5 grams of essentially anhydrous pyrrolidone from the same batch as used in the previous examples, there was added under a nitrogen atmosphere 4.17 grams of 85 percent potassium hydroxide, equivalent to 3.54 grams or 0.063 mole of pure potassium hydroxide. Then 12.5 grams of the mixture were distilled off at 100° C. and 0.8 mm. of mercury leaving approximately 50.0 grams of pyrrolidone, of which 0.063 mole was present as the potassium salt.

The 50.0 grams of pyrrolidone was divided into two equal parts, each containing 0.0315 mole of the potassium salt. To one portion there was added 0.37 ml. (0.878 gram or 0.00294 mole) of antimony pentachloride. The reaction mixture was permitted to sit for approximately 24 hours at 25° C. The polymer was recovered by breaking up the cake, grinding it in a Wiley mill, and washing the resultant powder first with water, and then with acetone, in a Waring Blendor. Following each wash the polymer was filtered. After washing was completed the polymer was air-dried and weighed. There was recovered 8.2 grams or 34 percent of the theoretical yield. The polymer had a specific viscosity, determined on 0.5 percent solutions in 90 percent formic acid, of 1.348.

EXAMPLE VI

To 0.5 gram samples of each, an antimony pentachloride activated polypyrrolidone and a benzoyl chloride activated polypyrrolidone prepared from the same batch of monomer and in accordance with the procedure of Example III, there was added 5.0 ml. of an aqueous solution of an acid dyestuff, Calcocid Alizarin 121 Blue SAPX C. I. Acid Blue 45; C. I. No. 63010 (in a concentration of 0.53 gram per liter of water). There was also added to the samples 10 ml. of water and 0.2 ml. of glacial acetic acid. Each mixture was boiled vigorously for 15 seconds, then filtered and the polymer washed with water. The benzoyl chloride activated sample only partially exhausted the dye from the dye bath, whereas the antimony pentachloride activated polypyrrolidone almost completely exhausted the dye from the dye bath. The depth of the dye on the antimony pentachloride activated polypyrrolidone was easily perceptible to the eye to be much greater than that of the benzoyl chloride activated polymer.

The dyed polymers were then separately put into 25 ml. of water and to each mixture there was added 0.5 ml. of concentrated ammonium hydroxide. Each mixture was boiled vigorously for 15 seconds and again filtered. The antimony pentachloride activated polypyrrolidone remained deeply dyed, whereas the benzoyl chloride activated polymer was weakly dyed.

The new activators of the present invention present many advantages over those known in the prior art. For example, polypyrrolidone prepared in the presence of these new activators has a greatly increased specific viscosity as well as good color. Furthermore, extremely good yields of polymer are obtained in polymerization procedures where the new activators are used. Another distinct advantage exhibited by the new activators of this invention is the greatly increased dyeability of polypyrrolidone prepared from polymerizations in which they are utilized. At the same time that the new activators of this invention result in the formation of polypyrrolidone which has greatly improved properties, the other physical characteristics of the polymer, such as solubility, for example, are not affected. In addition, the use of the new activators disclosed herein decreases materially the amount of time necessary to carry a pyrrolidone polymerization to completion. The new activator compounds are also readily available and inexpensive and may be employed without substantial changes in existing equipment used for pyrrolidone polymerization. Numerous other advantages will be apparent to those skilled in the art.

As many apparently widely different embodiments of this invention may be made without departing from the spirit and scope thereof, it is to be understood that the same is not to be limited to the specific embodiments thereof except as defined in the appended claims.

We claim:

1. A process for polymerizing pyrrolidone which comprises forming under essentially anhydrous conditions a mixture containing monomeric pyrrolidone, a catalyst selected from the group consisting of alkali metals, pyrrolidone salts of alkali metals, hydrides of alkali metals and alkali metal alkyls and aryls, and a polymerization activator selected from the group consisting of the trihalides of aluminum, bismuth and antimony, the tetrahalides of tin, titanium, zirconium and lead, and the pentahalide of antimony, said catalyst being employed in a range of 0.002 to 0.25 chemical equivalents of catalyst, said chemical equivalents being based upon the gram molecular weight of said catalyst divided by the valence of the metal in the catalyst based upon one mole of monomeric pyrrolidone, and said activator being employed in a range of 0.0001 to 0.075 chemical equivalents of activator, said chemical equivalents being based upon the gram molecular weight of the activator divided by the number of halogen atoms in the activator based upon one mole of monomeric pyrrolidone with a slight excess of catalyst over activator being present in said mixture, and subjecting said mixture to a temperature in a range of $-70°$ C. to $100°$ C.

2. The process as defined in claim 1 wherein the catalyst is sodium hydride.

3. The process as defined in claim 1 wherein the catalyst is potassium pyrrolidone.

4. The process as defined in claim 1 wherein the catalyst is sodium pyrrolidone.

5. The process as defined in claim 1 wherein the catalyst is sodium phenyl.

6. The process as defined in claim 1 wherein the polymerization activator is stannic chloride.

7. The process as defined in claim 1 wherein the polymerization activator is aluminum trichloride.

8. The process as defined in claim 1 wherein the polymerization activator is antimony pentachloride.

9. The process as defined in claim 1 wherein the polymerization activator is titanium tetrachloride.

10. The process as defined in claim 1 wherein the polymerization activator is bismuth trichloride.

11. A process for polymerizing pyrrolidone which comprises forming under essentially anhydrous conditions a mixture containing monomeric pyrrolidone, a catalyst selected from the group consisting of alkali metals, pyrrolidone salts of alkali metals, hydrides of alkali metals and alkali metal alkyls and aryls, and a polymerization activator selected from the group consisting of the trihalides of aluminum, bismuth and antimony, the tetrahalides of tin, titanium, zirconium and lead, and the pentahalide of antimony, said catalyst being employed in a range of 0.005 to 0.25 chemical equivalents of catalyst, said chemical equivalents of the catalyst being based upon the gram molecular weight of said catalyst divided by the valence of the metal in said catalyst based upon one mole of monomeric pyrrolidone, and said activator being employed in a range of 0.001 to 0.075 chemical equivalents of activator, said chemical equivalents of activator being based upon the gram molecular weight of said activator divided by the number of halogen atoms in said activator based upon one mole of monomeric pyrrolidone with a slight excess of catalyst over activator being present in said mixture, and subjecting said mixture to a temperature in the range of $20°$ C. to $70°$ C.

12. The process as defined in claim 11 wherein the polymerization catalyst is sodium hydride.

13. The process as defined in claim 11 wherein the polymerization catalyst is potassium pyrrolidone.

14. The process as defined in claim 11 wherein the polymerization activator is stannic chloride.

15. The process as defined in claim 11 wherein the polymerization activator is antimony pentachloride.

16. The process as defined in claim 11 wherein the polymerization activator is aluminum trichloride.

17. A process for polymerizing pyrrolidone which comprises forming a mixture under essentially anhydrous conditions containing 0.294 mole of monomeric pyrrolidone, and 0.0315 chemical equivalents of potassium hydroxide, said chemical equivalents being based upon the gram molecular weight of potassium hydroxide divided by the valence of potassium, reacting said mixture by subjecting the same to a temperature of $25°$ C. and removing the water which is formed during the reaction by vacuum distillation, adding 0.0147 chemical equivalents of antimony pentachloride, said chemical equivalents being based upon the gram molecular weight of antimony pentachloride divided by the number of halogen atoms in antimony pentachloride to the reaction mixture, and thereafter maintaining the reaction mixture at a temperature of $25°$ C.

18. A process for polymerizing pyrrolidone comprising forming under essentially anhydrous conditions a mixture containing 0.294 mole of monomeric pyrrolidone, 0.01192 chemical equivalents of stannic chloride, said chemical equivalents being based upon the gram molecular weight of stannic chloride divided by the valence of stannic, and 0.0315 chemical equivalents of sodium hydride, said chemical equivalents being based upon the gram molecular weight of sodium hydride divided by the valence of sodium and subjecting the mixture to a temperature of $25°$ C.

19. A process for preparing polypyrrolidone which comprises polymerizing pyrrolidone under substantially anhydrous conditions in the presence of a catalytic amount of an alkali metal salt of pyrrolidone as catalyst and a promoting amount of a compound selected from the group consisting of aluminum bromide and aluminum chloride as activator and allowing the pyrrolidone to polymerize to a solid polymer.

20. A process for preparing polypyrrolidone which comprises polymerizing pyrrolidone under substantially anhydrous conditions in the presence of a catalytic amount of an alkali metal salt of pyrrolidone as catalyst and a promoting amount of a tetrahalide of a metal selected from the group consisting of lead, tin, titanium and zirconium as activator and allowing the pyrrolidone to polymerize to a solid polymer.

References Cited

UNITED STATES PATENTS

| 2,622,076 | 12/1952 | Koch | 260—78 |
| 2,739,959 | 3/1956 | Ney et al. | 260—78 |
| 2,806,841 | 9/1957 | Barnes et al. | 260—78 |

FOREIGN PATENTS

| 870,844 | 3/1942 | France. |

WILLIAM H. SHORT, *Primary Examiner.*

MILTON STERMAN, H. BURSTEIN, *Examiners.*

J. A. SKOLER, H. D. ANDERSON, *Assistant Examiners.*